Sept. 5, 1944.      M. J. MATTHEYSES      2,357,418
RECTIFIER AND CIRCUIT
Filed May 29, 1942
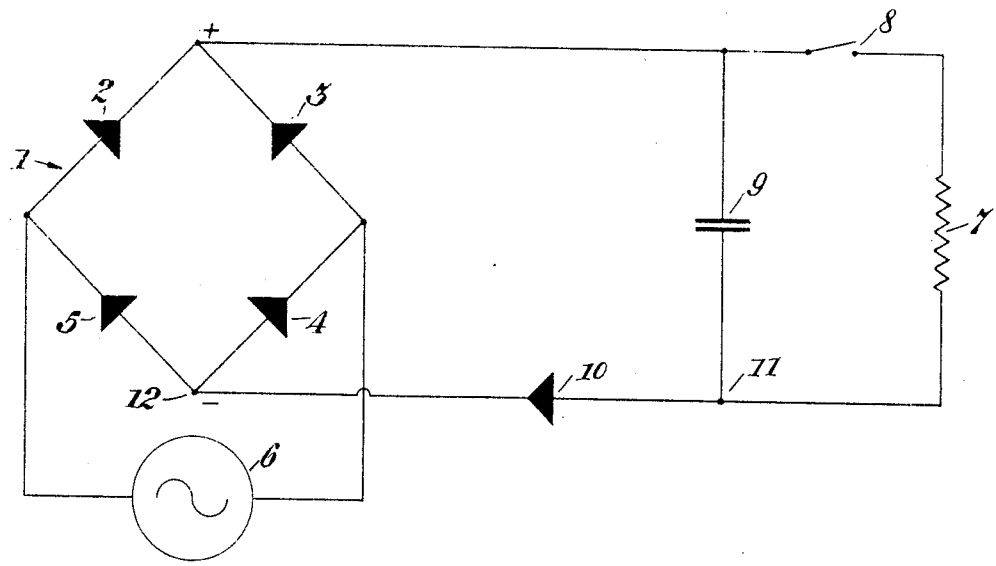
Fig. 1.
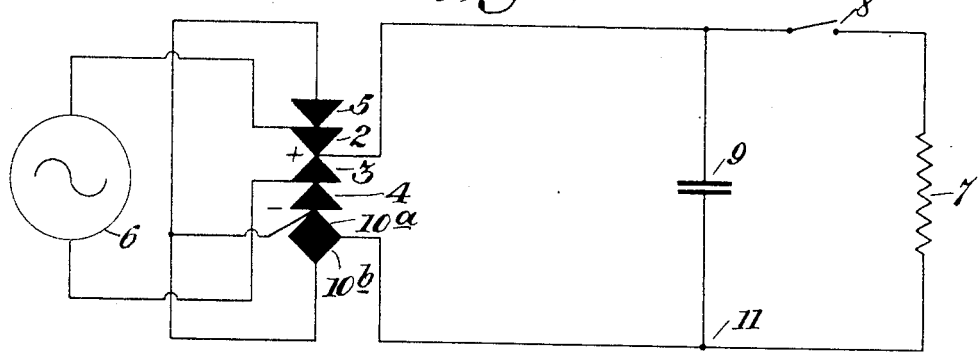
Fig. 2.
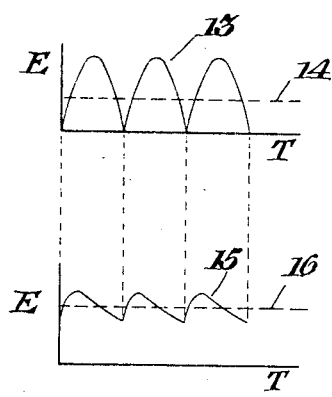
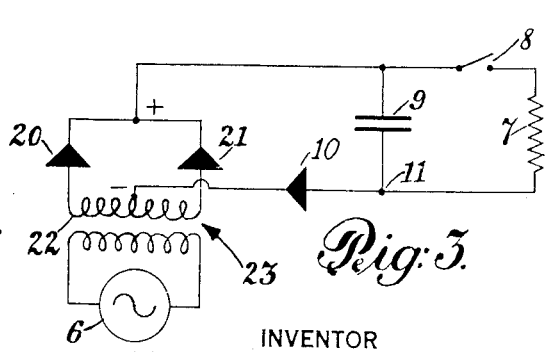
Fig. 4.     Fig. 3.
INVENTOR
MARCEL JACK MATTHEYSES
BY
ATTORNEY Patented Sept. 5, 1944

2,357,418

UNITED STATES PATENT OFFICE 2,357,418

RECTIFIER AND CIRCUIT

Marcel J. Mattheyses, Bronx, N. Y., assignor to Federal Telephone and Radio Corporation, a corporation of Delaware Application May 29, 1942, Serial No. 444,992

6 Claims. (Cl. 175—363)

This invention relates to rectifier circuits and has for its object to protect the rectifier from unduly large voltages when a load circuit is disconnected from the rectifier. A related object is to reduce the number of rectifier elements required in such systems.

It is a common practice to operate a load from an alternating current source through a rectifier, for example a selenium or copper oxide rectifier, and in the use of such rectifiers it is also common to connect a condenser across the rectifier to smooth out the residual alternating current ripple superimposed on the direct current. When a load circuit is disconnected from the rectifier so as to leave the smoothing condenser still connected across the rectifier, the result is to raise the voltage across the smoothing condenser and consequently across the rectifier. As many kinds of rectifiers such as selenium stack rectifiers can be injured by an excess of voltage, it has been customary in such cases to protect the rectifier by adding sufficient extra rectifier elements to take up the voltage increase when the load is disconnected.

When the plural arm type rectifier is used, such as the full wave including the common bridge type, it has been the practice to place the extra rectifier element in each of the rectifier arms. According to my present invention I obviate the necessity for placing the additional rectifier elements in each of the arms, by the expedient of placing the extra element or elements in one of the conductors leading from the rectifier to the smoothing condenser. This affords the same measure of protection against excessive voltage as if the extra elements were added in each arm of the rectifier and it obviates the requirement for so many separate extra elements.

My invention will be better understood from the following detailed description and the accompanying drawing of which Fig. 1 illustrates a circuit containing a rectifier according to my invention;

Fig. 2 illustrates the same circuit with the rectifier shown schematically in a common stack arrangement;

Fig. 3 illustrates another circuit embodying the invention; and

Fig. 4 illustrates voltage waves occurring in a circuit according to my invention with and without the load connected.

Referring to Fig. 1 there is shown a bridge type rectifier 1 which may be of the well-known selenium or copper oxide type comprising the individual rectifier units 2, 3, 4 and 5 in the four respective bridge arms. The rectifier is supplied with an alternating voltage from power source 6. The rectified current flows from the plus to the minus terminal through a load 7 shown simply as a resistant load. This may comprise a relay or some other desired type of apparatus. A switch 8 is used in the circuit to connect or disconnect the rectified current from the load. According to a common practice there is connected directly across the D. C. terminals of the bridge rectifier a smoothing condenser 9 which acts to smooth out the A. C. ripples from the D. C. line.

According to my invention I connect a rectifier element or unit 10 between one of the terminals 11 of condenser 9 and one of the D. C. terminals of the rectifier bridge. The rectifier 10 is shown connected in the negative D. C. conductor but it should be understood that it might as well be connected in the positive D. C. conductor. The effect of connecting the rectifier 10 in the line is to cause the voltage across condenser 9 to be applied across the bridge and the unit 10 in series and thus to reduce somewhat the amount of the voltage across the bridge.

Rectifiers of the dry type such as selenium or copper oxide rectifiers are commonly arranged in a stack. Fig. 2 illustrates schematically such a stack arrangement, the conventional form of solid triangles being used to illustrate the rectifier units, and the triangles pointing toward the direction of D. C. current flow. The rectifier is shown connected in the same circuit arrangement as in Fig. 1, the only difference being that in Fig. 2 the rectifier unit 10 is shown sub-divided into two units 10—A and 10—B which may be a desirable arrangement where a single stack is used for all rectifier elements, as this causes the amount of current through each rectifier element in unit 10 to be the same as through each rectifier unit in the bridge arm. But in Fig. 2 the current flowing from junction point 11 towards the bridge will divide about equally between the two elements 10—A and 10—B and thus flow toward the negative terminal of the bridge. This is a convenient way of stacking in one stack a number of rectifier units of equal size such that the current flowing through each unit or element will be the same.

Fig. 3 illustrates another embodiment of the invention utilizing a double arm rectifier of the full wave type. In this embodiment the full wave rectifier comprises the two rectifier units 20 and 21 receiving A. C. power in the usual way from the secondary coil 22 of a transformer 23, the primary of which is supplied from the A. C. source 6. The midpoint 23 of the secondary is one terminal of the rectifier, in this case the negative terminal, and the junction of rectifier units 20 and 21 is the positive terminal. The unit 10 is in series between the full wave rectifier and the load and performs the same function as the unit 10 in Fig. 1.

An advantage of using my invention is indicated in Fig. 4 wherein there are shown two voltage wave forms on a graph whose abscissae T represent time and whose ordinates E represent voltage. The curve 13 illustrates the full wave voltage across the rectifier when the resistive load 7 is connected, the broken line 14 representing the root-mean-square value of this voltage. This shows that at the end of each half wave the varying voltage reduces to zero. The wave 15 illustrates the wave form when the resistive load 7 is disconnected from the rectifier by opening switch 8 so as to leave only condenser 9 across the rectifier. Curve 15 is thus the curve for a capacitive load, showing that the voltage does not drop down to zero at the end of each half wave. By reason of this fact the root-mean-square value 16 is higher in this case than the root-mean-square voltage 14 in the case of the resistive load. This means that the voltage across the D. C. line has risen upon the opening of switch 8.

If the unit 10 were not present this added voltage would be applied directly across the entire rectifier and specifically across each rectifier arm; which would ordinarily require that each arm (2, 3, 4, 5 in Fig. 1, and 20, 21 in Fig. 3) be provided with sufficient additional rectifier elements in series to withstand the voltage. But by placing the unit 10 in series in the circuit from the rectifier as shown, the necessity for placing the additional elements in each rectifier arm is obviated, and there results a savings in rectifier elements while still affording the required amount of protection against voltage increases.

I claim:

1. A circuit comprising a plural-arm rectifier deriving power from an alternating voltage source, a resistive direct current load connected to said rectifier, a switch for disconnecting said load from the rectifier, a smoothing condenser connected across the D. C. output terminals of said rectifier and a second rectifier connected in series between said smoothing condenser and said plural arm rectifier, the polarity of said second rectifier with respect to the polarity of said plural-arm rectifier being such as not to substantially impede the current in said load when said switch is closed.

2. A circuit comprising a rectifier having a rectifier unit in each of a plurality of paths of current flow, a resistive load connected to the D. C. output terminals of said rectifier, a switch for disconnecting said load from the rectifier, a smoothing condenser connected across the D. C. output terminals of said rectifier, and a second rectifier connected in circuit between said condenser and a D. C. terminal of the first mentioned rectifier, the polarity of said second rectifier with respect to the polarity of said first mentioned rectifier being such as not to substantially impede the current in said load when said switch is closed.

3. A circuit comprising a plural-arm rectifier each arm of which contains a rectifying unit, a load connected to the D. C. terminals of said rectifier, a smoothing condenser connected across the D. C. terminals of said rectifier, a switch for disconnecting the load without disconnecting the condenser from the rectifier, and a rectifier unit connected in series between the condenser and the plural-arm rectifier, the polarity of said rectifier unit with respect to the polarity of said plural-arm rectifier being such as not to substantially impede the current in said load when said switch is closed.

4. A circuit comprising a bridge rectifier having a rectifying unit in each of four bridge arms, a resistive load connected to the D. C. output of said rectifier, a smoothing condenser connected across the D. C. output terminals of said rectifier, a switch for disconnecting the load without disconnecting the condenser from said rectifier, and a second rectifying unit connected between the condenser and the bridge rectifier, said second unit comprising a plurality of rectifier elements in parallel and having a polarity with respect to the polarity of said bridge rectifier such as not to substantially impede the current in said load when said switch is closed.

5. A circuit according to claim 4 in which the second rectifier unit comprises two rectifying elements connected to carry an equal amount of D. C. current in the same direction between the condenser and the bridge, the current-carrying capacity of each of said rectifier elements being substantially equal to the current carrying capacity of the rectifier elements in each bridge arm.

6. A rectifier system comprising a full wave rectifier having input and output terminals, a source of alternating current power connected to said input terminals, a load circuit connected to said output terminals, a filter condenser between said output terminals and said load, means for disconnecting said load from said filter condenser, and rectifier means for reducing the voltage across the units of said full wave rectifier when said load is disconnected.

MARCEL J. MATTHEYSES.